United States Patent [19]

Raymond et al.

[11] Patent Number: 5,419,088

[45] Date of Patent: May 30, 1995

[54] ENERGY ABSORBING MOUNTING SYSTEMS FOR MOTOR VEHICLES WINDOWS

[75] Inventors: Paul J. Raymond, Newtown; Robert W. Jans, Yardley; John J. Reilly, Elkins Park, all of Pa.

[73] Assignee: Rohm and Haas Company, Philadelphia, Pa.

[21] Appl. No.: 266,997

[22] Filed: Jun. 28, 1994

Related U.S. Application Data

[63] Continuation of Ser. No. 973,473, Nov. 9, 1992, abandoned.

[51] Int. Cl.[6] .......................... E06B 3/00; E06B 3/54; B60J 1/00
[52] U.S. Cl. ................................. 52/1; 52/98; 52/208; 52/204.591
[58] Field of Search .................. 52/207, 208, 204, 591, 52/1, 98

[56] References Cited

U.S. PATENT DOCUMENTS

| | | |
|---|---|---|
| 3,843,193 | 10/1974 | Saint-Gobain . |
| 4,068,428 | 1/1978 | Peterson ...................... 52/DIG. 13 |
| 4,217,424 | 8/1980 | Weese et al. ...................... 525/67 |
| 4,246,374 | 1/1981 | Kopchik ............................ 525/329 |
| 4,409,758 | 10/1983 | Dickerson et al. ................... 52/202 |
| 4,477,499 | 10/1984 | Doin et al. ....................... 106/287.12 |
| 4,616,456 | 10/1986 | Parker ........................... 52/DIG. 13 |
| 4,635,420 | 6/1987 | Batky ................................ 52/208 |
| 4,645,708 | 2/1987 | LeGrand ............................ 156/106 |
| 4,663,228 | 5/1987 | Bolton et al. ....................... 156/106 |
| 4,700,525 | 10/1987 | Nieboer et al. ...................... 52/208 |
| 4,727,117 | 2/1988 | Hallden-Abberton et al. ..... 525/343 |
| 4,759,810 | 7/1988 | Jackson et al. ...................... 156/64 |
| 4,839,206 | 6/1989 | Waldenberger ..................... 428/40 |
| 4,925,511 | 5/1990 | Ikeda et al. ......................... 156/106 |
| 5,027,569 | 7/1991 | Keys .................................. 52/208 |
| 5,035,096 | 7/1991 | Ohtake et al. ........................ 52/208 |
| 5,061,531 | 10/1991 | Catalano .......................... 264/328.1 |
| 5,066,723 | 11/1991 | Randall et al. ...................... 525/194 |

FOREIGN PATENT DOCUMENTS

| | | |
|---|---|---|
| 2146956 | 6/1973 | France . |
| 2157189 | 6/1973 | France . |
| 2944753 | 5/1981 | Germany . |
| 3518145 | 11/1986 | Germany . |

*Primary Examiner*—Carl D. Friedman
*Assistant Examiner*—Robert J. Canfield
*Attorney, Agent, or Firm*—Joseph F. Leightner

[57] ABSTRACT

The invention describes plastic automobile windows that are safe during side impact collisions, including a method for installing the windows into the motor vehicle. The mounting system and window material will contain an occupant in a vehicle at low to moderate head impact velocities. The occupant is not subjected to head injuries. The occupant is not subject to lacerations.

The window design uses a high modulus transparent thermoplastic, having an abrasion resistant coating. The window is attached to the window opening in a motor vehicle by using one of several mounting techniques as described herein. For fixed windows, the mounting systems will bond the window to the vehicle under normal operating conditions and provide a weather seal. For a movable window, the window frame will be equipped with a sliding track and provide a weather seal. A groove or notch in the window material inward from the edge in combination with the mounting systems enhance a safe release of the plastic window.

By choosing the thickness of the window and specific mounting technique, the plastic window can be made to be pushed out, so that the window remains intact and no injury is made to the impacting occupant's head. The mounting system is designed so that the window will be pushed out and be released from the vehicle in a safe manner. The breakaway zone in the window will break along a notch cut or molded into the window. The window will break and any fragments will be safely released from the window frame by a notch breaking.

9 Claims, 4 Drawing Sheets

ENERGY ABSORBING MOUNTING SYSTEMS FOR MOTOR VEHICLES WINDOWS

This application is a continuation of application Ser. No. 973,473 filed Nov. 9, 1992, abandoned.

FIELD OF INVENTION

Energy Absorbing Mounting Systems for Motor Vehicle windows, particularly for automobiles, that are safe for vehicle impact collisions are described.

DESCRIPTION OF PROBLEM

Side and rear windows in motor vehicles are currently manufactured from float glass that has been tempered. Tempering of glass places the two outer surfaces of the glass into compression. Therefore when the glass is impacted it will shatter into very small pieces. Tempered glass has replaced annealed glass in window openings of motor vehicles. Annealed glass breaks into large dagger-like shards that can easily lacerate and seriously injure a vehicle occupant. While tempered glass has reduced lacerations, there remain several problems.

Tempered glass can cause laceration of an occupant because the small fragments have very sharp edges; and if a tempered glass window breaks, pieces of glass remain embedded in the edge of the window. This may cause parts of a person's body to be raked along the edge of the window and result in serious lacerations.

Since tempered glass will shatter, it does not offer the vehicle occupant any protection from being ejected from the passenger compartment. If the vehicle is impacted from the side, the passenger could be partly or wholly ejected out through the window opening. If the vehicle begins to tumble in a rollover then the occupant could be partially or fully ejected and could incur a serious or a fatal injury once parts of the body are outside the vehicle.

Some work is known that attempts to improve the laceration and containment deficiency of tempered glass. Windshields, for example, are composed of two layers of glass separated with a thin layer of plastic. The inner layer, made of poly (vinyl butyral), holds the broken glass together upon vehicular impact. A further refinement is found in that a second plastic layer is applied to the inner surface of the window.

A moveable window design with a combination of an inner plastic layer and an outer glass layer is known. This window is intended to contain the occupant within the vehicle during a side impact collision. This is accomplished by a multi-part structure composed of a plastic frame that moves up and down in a special track design. The plastic frame has an edge in the shape of a "T," and acts to sandwich together the outer glass layer and the inner plastic layer. The disadvantages are that the inner plastic layer is prone to scratching, reducing driver visibility, and the frame adds weight to the glazing structure.

A few inventions have been described using thermoplastic window for motor vehicles. U.S. Pat. No. 4,635,420 describes an acrylic window material that is ultrasonically welded to a plastic gasket. A safety feature is disclosed where grooves or notches are placed inward from the edge of the acrylic window to facilitate breakaway zones. Two disadvantages in this type of gasket installation are that it is not commonly used by original equipment manufacturers and is not economical to manufacture. Another patent describes a synthetic resin window for a vehicle that has a frame or gasket molded from the same synthetic resin material. This window is lightweight yet does not incorporate any feature that makes it safe during a potential side impact collision.

It would be desirable to use a monolithic glazing structure composed of a thermoplastic resin with a window mounting system that can reduce lacerations, produce no head injuries and provide occupant containment. A further benefit may be from a reduction in weight of the window structure.

BRIEF DESCRIPTION OF THE DRAWINGS

FIG. 5 is a section taken through the bottom of the side window in FIG. 4 showing a molting bolt that attaches the window module to the vehicle chassis.

Referring now to FIGS. 1, 2, 3, 4, 5, and 6 there is shorn a synthetic resin window according to one embodiment of the present invention, which may be used in an automotive vehicle. The window module is designated by reference numeral 1, and is made of an appropriate thermoplastic resin by means of an injection molding or thermoforming process, as will be described hereinafter, and secured to a relevant vehicle chassis panel 6 with a mounting system.

Figure 1:
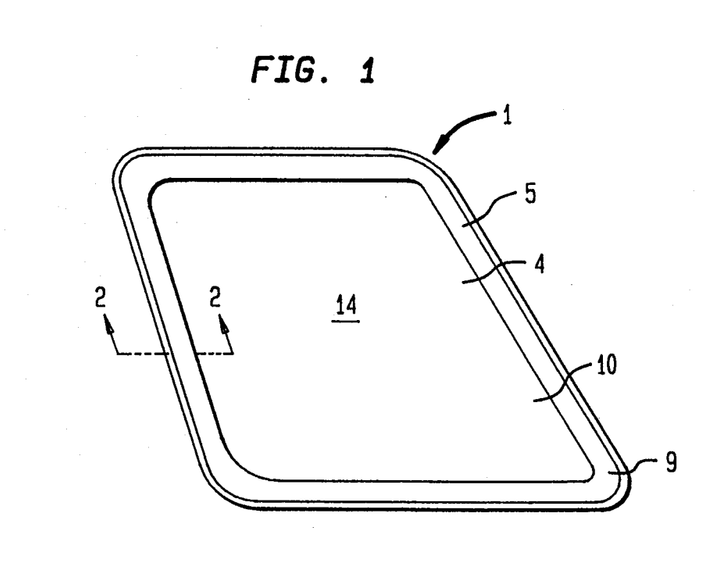
FIG. 1 is a perspective view of a side window module for an automotive vehicle according to one preferred embodiment of the invention.

The window module 1 includes a window body portion 4 in the form of a sheet of transparent or semi-transparent synthetic resin, such as polycarbonate resin, acrylic resin or polyglutarimide resin, or the like. The window module 1 further includes a frame portion 5 extending along the peripheral edge of the window body portion 4. An abrasion resistant coating 10 covers the surfaces of the window body portion 4. If there is not a molded frame portion 5, a pressure sensitive foam tape, or sealant, such as polyurethane, 16 can be used as hereinafter described. A notch or groove 9 cut or molded into the window body portion 4 will enhance the formation of a breakaway zone 14.

Figure 2:
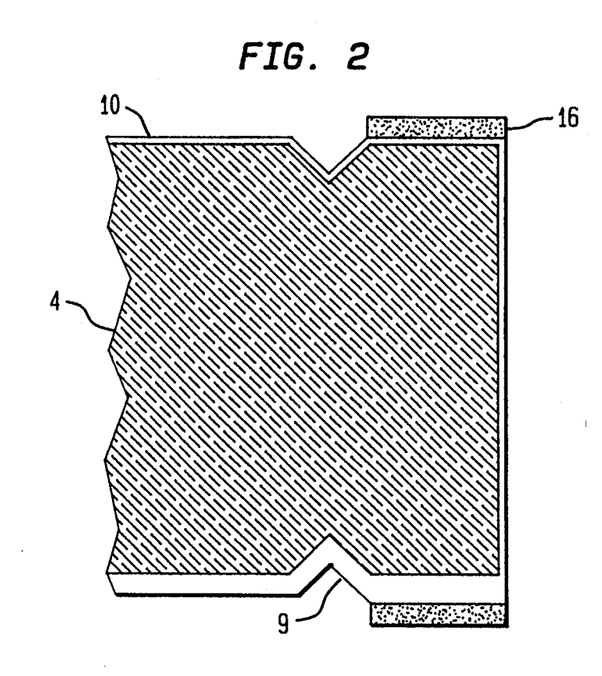
FIG. 2 is a fragmentary cross-sectional view of an embodiment of a sheet of thermoplastic glazing material.
Figure 3:
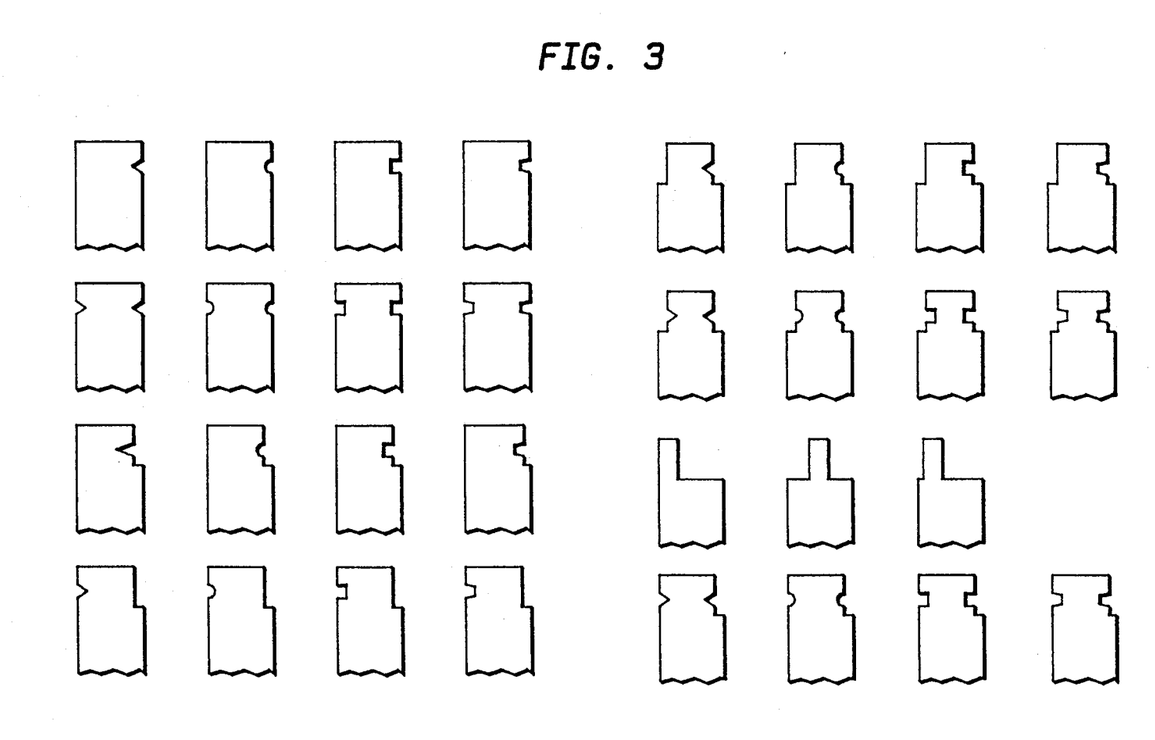
FIG. 3 is a schematic representation showing other variations in the embodiment of FIG. 2.

In FIG. 2 and FIG. 3 embodiments, notches or other shaped grooves 9, can be cut or molded into one or both sides of the synthetic resin glazing material. Some of the possible shapes shown in FIG. 3 can be cut or molded into the synthetic resin glazing materials as taught by U.S. Pat. No. 4,635,420. A double sided adhesive foam strip 16 is adhered around the edge of the glazing material.

Figure 4:
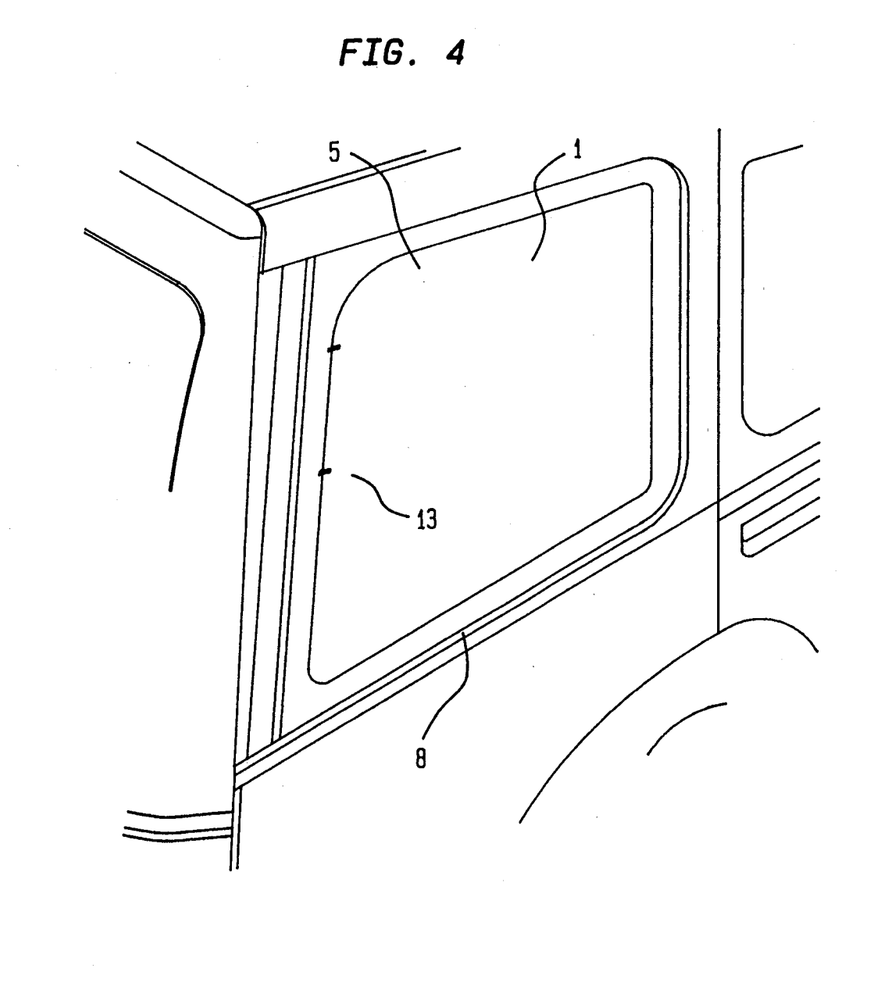
FIG. 4 is a perspective view of another embodiment of the invention, i.e., a side window installation in a motor vehicle, using Reaction Injection Molded (RIM).
Figure 5:
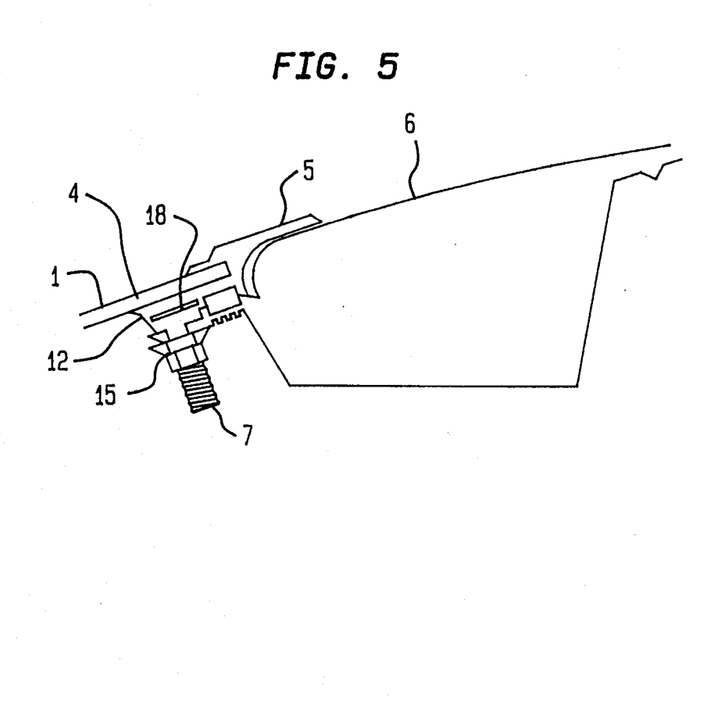
FIG. 5 shows a cross section of the window assembly with frame and mounting bolt.

In FIG. 4 and FIG. 5, a typical motor vehicle window aperture 8 is shown on the rear side. The metal edge of the aperture, as part of the chassis panel 6, has bolt holes 13.

FIG. 5 is a cross section of the window module 1 installed in a window aperture 8. The thermoplastic window material 4 is encapsulated by a RIM mounting frame 5. A mounting bolt 7 has its bolt head 18 embedded in the interior facing section of the RIM 12. The mounting bolt attaches the window module 1 to the motor vehicle chassis panel 6 using a threaded nut 15.

Figure 6:
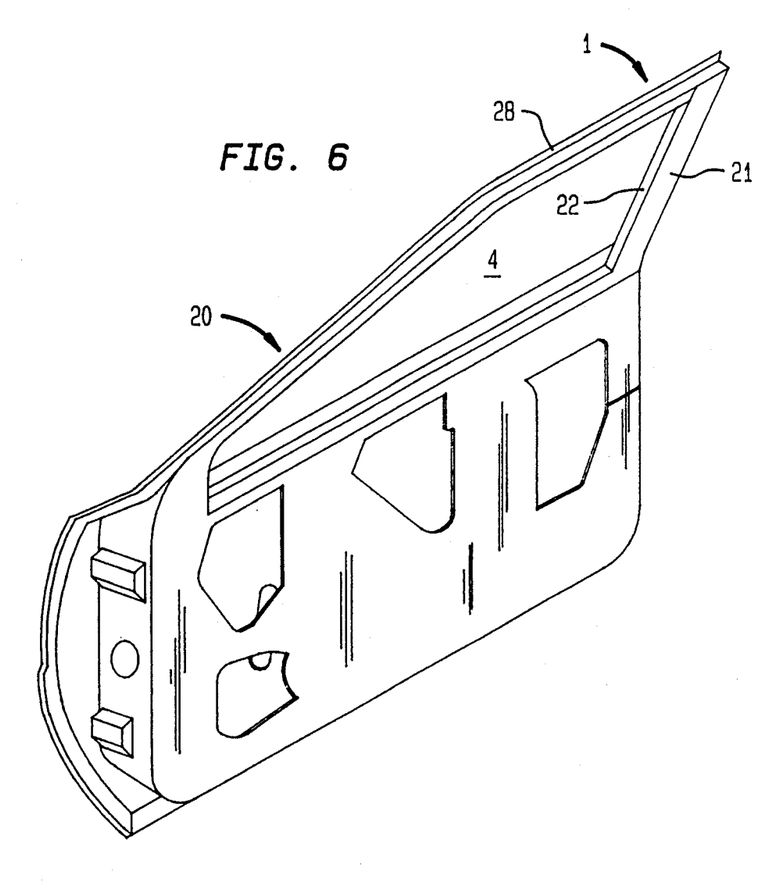
FIG. 6 is a perspective view of another embodiment of the invention referring to moveable window installations in a vehicle door frame.

FIG. 6 shows a thermoplastic window 4 installed in a door 20. The frame 21 of the upper portion of the door 28, holds the window material in a track 22. The track acts to absorb energy of an impact and functionally allows the thermoplastic window 4 to travel up and down.

SUMMARY OF INVENTION

We have designed several energy absorbing mounting systems which when used in combination with transparent thermoplastic automobile windows produce unexpected safety benefits such as no head injuries (HIC[1] < 1000), little or no lacerations (Chamois Laceration Scale[2] < 1) and enhanced occupant containment in vehicle crashes. The window designs preferably use an abrasion resistant coated thermoplastic with high modulus (i.e., above about 2.0 GPa). There are many different mounting system designs that may be used to achieve this behavior and some are described below.

[1] Head Injury Criteria (HIC) from 49CFR 571.208:

$$HIC = \left[ \frac{1}{t_2 - t_1} \int_{t_1}^{t_2} adt \right]^{2.5} (t_2 - t_1) \quad \text{Eq. (1)}$$

where a = the resultant head acceleration expressed as a multiple of g (the acceleration of gravity), where $t_1$ and $t_2$ are any two points in time during the impact which are separated by not more than a 36 millisecond time interval and where $t_1$ and $t_2$ are selected so as to maximize Eq. (1).

If the HIC value is below 1000, then 49CFR 571.208 states that the potential for head injury is unlikely. If the HIC value is above 1000, then the potential for head injury is possible.

[2] Chamois Laceration Scale:

| 0 | Superficial Cuts | Pass |
| 1 | Outer Layer Cuts | Pass |
| 2 | Inner Layer Cuts | Fail |

Reference Society of Automotive Engineers Paper Number 860198 (1986).

The window body portion 4 can be attached to the vehicle chassis panel 6 by using a foam tape 16 with a pressure sensitive adhesive. The adhesive will bond the foam tape core to the window and the vehicle providing a weather seal.

The combination of the thermoplastic window and a foam-based adhesive tape allows the window to stretch out in the window opening in the plane of the window yet not disengage or break at low to moderate head velocities. If there is an impact to the window by a vehicle occupant the window will not break, nor will the occupant receive any lacerations (as the window will not break), nor will the occupant receive any head injury at low to moderate head velocities. Low to moderate head velocities are velocities that could range from 0 to 32 kilometers per hour. High head impact velocities are those velocities above about 32 kilometers per hour. The tape can be made strong enough to hold the window in place but can stretch to many times its original thickness and provide enhanced energy absorbing characteristics. If the window should break, due to a flaw in the design, then the tape will let any broken pieces be safely retained in the window opening. If the window disengages, however, much of the kinetic energy of the impact will either go into ripping the tape apart (cohesive failure) or ripping the tape from the window or frame (adhesive failure). Once the broken pieces are pushed out away from the window opening, the tape rips itself and can not elastically pull the pieces back towards the plane of the window aperture.

In combination with the use of tape 16, a notch or groove 9 can be cut, machined or molded into the plastic glazing material 4. The groove or notch molded or machined into the thermoplastic window inward from the edge will enhance a breakaway zone 14. The notch or groove should be shallow enough so that the plastic glazing does not pop-out at low to moderate head impact velocities, for example, 0 to 32 kilometers per hour, and the plastic glazing should be designed so that the plastic glazing does pop-out or break at high head impact velocities, for example, above 32 kilometers per hour. Various depths and various shapes of the notches may be used to effectively release the plastic glazing fragments. At higher head impact velocities, the plastic will break along the notch in a defined breakaway zone and release the window from the edge. This will safely release any broken fragments of the plastic glazing. In combination with the notch, the tape will let any fragments safely hang down and away from the occupant, therefore, if the breakaway zone does not behave as designed, the occupant is unlikely to receive any injury to the head as will be shown in the examples hereinafter.

The window also can be attached to the window aperture in a motor vehicle by using an automotive grade polyurethane sealant. The polyurethane will bond the window to the vehicle and provide a weather seal.

In combination with the use of polyurethane, a notch or groove can be cut or molded into the plastic glazing material. A groove or notch molded or machined into the thermoplastic window inward from the edge will enhance a safe release of the window.

The combination of a thermoplastic window, polyurethane sealant, and notched perimeter allows the window to stretch out of the window frame opening. If there is an impact to the window by a vehicle occupant, the window will not break, nor will the occupant receive any lacerations since the window will not break, nor will the occupant receive any head injury at low to moderate head velocities. The polyurethane is strong enough to hold the window in place, but can stretch to several times its original thickness. If the window does disengage, much of kinetic energy of the impact will go into breaking the thermoplastic along the notch. If the window should break, due to a flaw in the design, then cracks in the thermoplastic will propagate outwards towards the edge of the window and break along the notch. The occupant does not receive any serious injury to the head as has been shown in the examples.

The thermoplastic window 4 can also be encapsulated with a reaction injection molded (RIM) thermoset frame 5, changing the failure mode of traditional glazing systems. The frame 5 is attached to the chassis panel 6 in a motor vehicle by bolts 7 where the bolt heads 18 are molded into the backside of the RIM material 12, and the bolt protrudes through holes 13 that are located in the vehicle frame. Some type of butyl weather sealing tape is used on the interior RIM surface 12 prior to placing the window module 1 onto the vehicle window aperture. The bolts are then affixed to the vehicle frame by threaded nut connectors 15. At moderate head impact velocities, for example, 23 to 32 kilometers per hour, a tempered glass window encapsulated with RIM will shatter, but broken pieces of glass will be retained in the perimeter area where it is bonded to the RIM encapsulation. This may cause parts of an occupant's body to be raked along the edge of the window and may result in serious lacerations. By using an abrasion resistant coated (ARC) transparent plastic window encapsulated with RIM, the failure mechanism is unexpectedly changed from breakage of the window to either the pulling out of the bolt heads 18 from the RIM encapsulation 12, or the ripping of the RIM encapsulation 12. The ripping of the RIM encapsulation may occur either cohesively or adhesively at the interface where the RIM is bonded to the plastic window. At moderate head impact velocities, the plastic window will not break, nor will the occupant receive any lacerations, and the window does not leave the window aperture since all the bolt heads 18 do not pop out. Most of the kinetic energy is dissipated by pulling out the bolt heads. Therefore, the occupant does not receive any head injury.

The occupant does not receive any lacerations (as the window does not break), nor does the occupant receive any head injury at high head impact velocities, for example, above 32 kilometers per hour, as has been shown in the examples. At these velocities, most of the energy is dissipated by detaching the bolt heads 18 from the RIM 12.

In contrast to the above mentioned fixed window designs, the unique combination of a plastic window 4 and a door frame 21 equipped with a sliding track 22 to allow the window to move up and down offers surprisingly high energy absorbing characteristics. At low to moderate head velocities, the plastic window will not break but will transfer a significant portion of this energy to the surrounding door frame and cause it to deflect outward from the vehicle. This energy dissipation mechanism prevents the plastic window from breaking and therefore the occupant does not receive any lacerations. This deflection of the door frame enables the plastic window to contain the occupant at unexpectedly high impact velocities and prevents the occupant from receiving any head injury. At higher head impact velocities, the plastic window is still able to transfer energy to the frame before breaking or disengaging from the door frame area. The frame may be designed with a U-shaped channel to accommodate the edges of the ARC coated window. The frame may be designed in conjunction with the above mentioned plastic windows to optimize the energy absorbing characteristics in a vehicle crash environment.

DETAILED DESCRIPTION OF INVENTION

The thermoplastic resin can be any high modulus transparent material, such as poly (methyl methacrylate) (PMMA), impact modified poly (methyl methacrylate), acrylic copolymers, poly (methyl methacrylate-co-alkyl acrylate) wherein the alkyl group contains 1 to 8 carbon atoms, acrylic blends, acrylic alloys, poly (vinyl chloride), poly (styrene-co-acrylonitrile) wherein the acrylonitrile polymer comprises up to 40% of the copolymer, polycarbonate, poly (ethylene terephthalate), polystyrene, poly (styrene-co-methyl methacrylate), poly (alpha-methylstyrene-co-methyl methacrylate), poly (alpha-methylstyrene-co-alkyl acrylate) wherein the alkyl group contains 1 to 8 carbon atoms, poly (vinyl acetate), poly (ester carbonate), polyarylate, poly (ether sulfone), or polyetherimide. One such acrylic copolymer could be a polyglutarimide and poly (methyl methacrylate) copolymer, also known as poly (methyl methacrylimide) (PMMI), i.e., U.S. Pat. Nos. 4,246,374; 4,217,424; and 4,727,117 assigned to Rohm and Haas Co.; and others. The elastic modulus should be in the range of 2.0 to 4.2 GPa, have a coefficient of thermal expansion of about 4 to $8 \times 10^{-5}$ cm/cm/°C. at room temperature, and a continuous service temperature of at least about 70° C. or more for an acrylic thermoplastic. Ranges for other thermoplastic resins are above about 115° C. for PMMI, and above about 110° C. for polycarbonate. These conditions are necessary to provide a window that will not flutter when driven at high vehicle velocities, does not greatly expand its dimensions with temperature and maintains its integrity at the high temperatures that vehicles can reach. It is possible that plastic fillers, impact modifiers, coefficient of thermal expansion modifiers, continuous service temperature modifiers, stiffness modifiers, such as glass fillers; other plastic additives, and stabilizers can be used to modify other thermoplastic materials to these performance criteria by any person knowledgeable in plastic compounding technology. These glazing materials may be colored or tinted, for example, to reduce solar transmission levels.

Any of the above thermoplastics are usually formed into the shape and size of a window by using sheet or molding powder (pellets). The thermoplastic sheet can be from about 1.5 to 6 mm in thickness and drape-formed or thermoformed using an appropriate mold. The plastic sheet is heated to a temperature so that it softens and can easily take on the shape of a mold.

Another technique to form the windows is to injection mold pellets of the thermoplastics in an injection molding machine that will fill a mold cavity with the molten plastic material. The specific molding conditions are highly dependent on the thermal and flow properties of the material. For an optical application, it is best to mold under conditions that provide for the least amount of residual stress in the molded part. The window thickness can be from between about 1.5 to 6 mm.

The window 4 used in this invention has been treated on both sides with an abrasion resistant coating 10. This provides a hard surface that is not easily scratched. Coatings such as polysiloxanes, transparent thermosetting resins, UV-curable coatings, polyurethanes, or diamond-like abrasion resistant coatings may be practical for this use. Coatings may be applied by plasma deposition, ion implantation, ion-assisted coating, evaporation, sputter deposition, physical or chemical vapor deposition, thermal spraying, and plasma assisted depositions. Other abrasion resistant coatings are known in the art.

Before the coating process begins, the thermoplastic part is annealed in an oven to remove any residual stress. The polysiloxane used in this invention is applied in conjunction with a primer and is typically coated by dipping the plastic glazing part into a liquid coating solution. However, flow, sprayable, curtain and other coating techniques may also be used. After each coating step the part is dried in an oven at elevated temperature.

Any hard coating could be used, though it would have to be compatible with both the thermoplastic and the mounting system.

One adhesive used in this invention is a foam tape, made from acrylic based materials, and has a pressure sensitive adhesive on both sides of the tape. Or the tape could have a hot melt adhesive. The tape is typically 5 mm to 26 mm wide and from 1 mm to 7 mm thick. The foam density should be about from 0.3 to 0.8 grams per cubic centimeter.

Other kinds of tapes could be used for the attachment of the thermoplastic window, such as polyurethane, or neoprene or any other type of foam material that can be formed into a tape with two adhesive layers. The tape should preferably be water and weather resistant. Any of these materials could be enhanced so that they meet these criteria by adding additives, stabilizers, plasticisers and blowing agents known in the art.

The foam density is of importance in the performance of this invention. For instance, it has been shown that a tape of density in the lower part of the range given will tear during an impact to the plastic window, but a foam in the higher part of the density range will not tear. If the window does break, the foam with the higher density will more likely hold broken pieces in the plane of the window and may cause lacerations.

The pressure sensitive adhesive on the vehicle side of the tape should be formulated to adhere well to the paint systems used on motor vehicles. The adhesive strength between the tape and the plastic or paint surface should be higher than the cohesive strength of the tape. A cohesive failure of the tape can be predicted by its mechanical properties.

Other types of sealants could be used and might provide the same effect. Polyurethanes, silicones, and acrylic based sealants are commonly used in the automotive industry. Butyl rubber based products, polysulfides, terpolymers of ethylene, propylene and a nonconjugated diene, ethylene propylene dimers (EPDM), thermoplastic elastomers, and thermosets such as epoxies, and hot melts could also be used to bond the plastic window to the motor vehicle. An attachment system such as Velcro could be engineered to provide the energy absorbing design to hold the thermoplastic window at low to moderate head impact velocities. At high head impact velocities, the specially designed Velcro attachment system could then rip itself apart, safely releasing the window module.

Other mounting methods such as polymeric encapsulation around the edge of the plastic glazing can be used. Two examples are reaction injection molded thermosets (RIM) or injected molded polyvinyl chloride (PVC). Other thermoplastics could be molded around the window material such as PMMA, modified PMMA, PMMI, polycarbonate and other synthetic resins. These materials are used to form a frame around the window and then are mechanically or adhesively bonded to the window aperture.

The energy dissipating characteristics of the RIM system may be improved by the following techniques to further reduce the potential for lacerations and head injuries to the occupant over a broader range of head impact velocities. One method is to bond the bolt heads to the RIM material. This may be done by applying a primer or an adhesion promoter to the bolt heads prior to injecting the RIM material. This may also be achieved by applying an adhesive at the RIM/bolt head interface to improve the pull-out strength of the bolt heads.

Another method is to increase the dimensions of the bolt heads. This method would increase the surface area of the bolt head and would make it more difficult for the bolt head to pull out through the opening in the RIM material where the bolt protrudes toward the vehicle frame. This method would also increase the surface area of the bolt head that would be available to bond the bolt to the RIM material.

Another method is to design the mounting system such that a bolt head and nut assembly clamps down on the RIM material instead of the compression stop on the bolt. This would prevent the bolt head from popping out of the RIM material and force the RIM material to tear either cohesively around the clamped area or adhesively at the interface where the RIM encapsulation is bonded to the plastic window.

Another technique is to increase the number of bolts used to attach the window module to the vehicle. This would help to reduce the stress loads at each of the bolt locations and provide additional energy dissipation. The thickness of the RIM material that is holding the bolt head in the RIM could also be increased. This would allow the RIM to provide additional resistance and help prevent the bolt from pulling out. Another possibility is to use a slightly more rigid RIM material to hold the bolt heads in place during the head impact. Note that the above techniques may be used separately or in combination on any type of fixed window.

In combination with any of the above mentioned window mounting methods, a notch or groove 9 may be placed inward from the edge of the plastic window to provide a breakaway zone. Various types of notches are disclosed in U.S. Pat. No. 5,035,096. Any combination of notches could be used in conjunction with the window mounting techniques to define specific breakaway zones 14 in the plastic window. The notch depth is preferably between 10 and 80% of the thickness of the plastic window. In the breakaway zones the radius can be from about 5% of the part thickness to about 200% or more of the part thickness, and may be molded, cut, or machined into the thermoplastic glazing.

The notch is designed in terms of radius, type of cross section, location along the perimeter (along any number or sections of the sides of the window), distance inward from the edge (1 to 100 mm, for example, so as to aesthetically pleasing) and depth, so that the section of the window inward of the notch or groove will break out along the notch at relatively high impact velocities, for example, above 32 kilometers per hour. At low to moderate head impact velocities, for example, 0 to 32 kilometers per hour, the notch should not break. This will provide for containment of the occupant under less severe impact conditions, greatly reducing the possibility of ejection of the occupant from the vehicle through the window opening.

This invention is based on mechanical and physical properties of the plastic glazing material and the mounting system used to bond the plastic to the vehicle window opening. Tempered glass is a very high modulus, brittle material that is designed intentionally to break into small fragments upon impact. However, tempered glass breaks at an impact velocity that is relatively low compared to the typical crash velocities as specified in several government testing procedures (see 49CFR 571.214, etc.).

The properties of the thermoplastic materials in the invention are such that the plastic window will not break at the head velocities where tempered glass shatters, for example below 23 kilometers per hour. If used in combination with the mounting systems mentioned above, the whole glazing structure will be stretched or deflected out from the vehicle structure. By judiciously choosing the thickness of the window and specific mounting system, the window module can be made to be pushed out so that the window remains intact and limits the likelihood of injury to the impacting occupant's head or body parts. At very high head impact velocities the mounting system can be designed so that the window will be released from the vehicle in a safe manner. Either the window will detach itself from the mounting system, break along the breakaway zone cut into the window, or the window will break and any fragments will be safely released from the window frame by a notch breaking or, in one case, by a foam tape ripping itself apart.

This invention is used for mounting plastic windows into motor vehicles. The types of windows are: windshields, moveable windows as found on the side of motor vehicles, side windows that do not move, opera windows, flipper windows, or other types of venting windows, and back windows. Types of motor vehicles are passenger cars, light trucks, multi-purpose vehicles, off-road vehicles, heavy trucks, buses, recreational vehicles and motor homes.

EXAMPLES

Example 1

Extruded sheet of PMMI, 5 mm thick, is thermoformed into the shape and size of an automobile side quarter window. The plastic window is coated with an abrasion resistant coating, i.e., a polysiloxane. The window is pre-treated with a liquid primer and cleaner. Two automotive foam tapes, with densities in the range of 0.5 to 0.65 and 0.6 to 0.75 grams per cubic centimeter, and 6.2 and 12.5 mm wide, are pressed onto the treated surface. The window and tape are then installed adhesively into a quarter window frame opening by revealing the second side of the foam tape.

The window is tested by launching a human surrogate head (49 CFR572E defines head and geometry) at 26, 34 and 40 kilometers per hour towards the window. Data are collected regarding the head deceleration upon impact, the disposition of the window and any fragments, and the laceration is measured using a two-layer chamois skin placed over the head. The disposition, chamois laceration values[2], and HIC[1] values of the window or its fragments are shown below.

| Head Velocity (km/hr) | Tape Density (gm per cc) | Tape width (mm) | Window Disposition | Chamois Laceration Scale | Head Injury Criteria |
|---|---|---|---|---|---|
| 26 | 0.5 to 0.65 | 12.5 | no break | 0 | <1000 |
| 34 | 0.5 to 0.65 | 12.5 | break | 0 | <1000 |
| 34 | 0.5 to 0.65 | 12.5 | no break | 0 | <1000 |
| 40 | 0.5 to 0.65 | 12.5 | no break | 0 | <1000 |
| 26 | 0.6 to 0.75 | 12.5 | no break | 0 | <1000 |
| 34 | 0.6 to 0.75 | 12.5 | break | 0 | <1000 |
| 40 | 0.6 to 0.75 | 12.5 | break | 0 | <1000 |
| 30 | 0.5 to 0.65 | 6.2 | no break | 0 | <1000 |

Example 2

Extruded sheet of PMMI, 5 mm thick, is thermoformed into the shape and size of an automobile side quarter window. The plastic window is dip coated with a polysiloxane abrasion resistant coating. A notch in the shape of a letter v, with a 60° angle, is cut 14 mm inward from the outer edge of the window. The notch in several cases is from 2.5 to 3.0 mm deep. The window is pre-treated with a liquid primer and cleaner. Two automotive foam tapes, with densities in the range of 0.5 to 0.65 grams per cubic centimeter, and 12.5 mm wide, are pressed onto the treated surface. The window and tape are then installed adhesively into a quarter window frame opening by revealing the second side of the foam tape.

The window is mounted to the window aperture in a portion of the vehicle chassis panel. The window module is then tested by launching towards the test fixture a human surrogate head (49 CFR572E defines head and geometry) at 26, 34 and 40 kilometers per hour. Data are collected regarding the head deceleration upon impact, the disposition of the window and any fragments, and the laceration is measured using 2 layers of chamois skin placed over the head. The disposition, chamois laceration values[2], and HIC[1] values of the window or its fragments are shown below.

| Head Velocity (km/hr) | Notch Depth (mm) | Window Disposition | Chamois Laceration Scale | Head Injury Criteria |
|---|---|---|---|---|
| 26 | 2.5 | no break | 0 | <1000 |
| 34 | 2.5 | break along notch | 0 | <1000 |
| 34 | 2.5 | break along notch | 0 | <1000 |
| 40 | 2.5 | break along notch | 0 | <1000 |
| 40 | 2.5 | break along notch | 0 | <1000 |
| 24 | 3.0 | no break | 0 | <1000 |
| 30 | 3.0 | break along notch | 0 | <1000 |
| 33 | 3.0 | break along notch | 0 | <1000 |

Example 3

Extruded sheet of PMMI, 5 mm thick, is thermoformed into the shape and size of an automobile side quarter window. The plastic window is dip coated with a polysiloxane abrasion resistant coating. The window can have a notch or groove machined inward from the perimeter with a depth of 1.0 to 3.0 mm. The window is pre-treated with a liquid primer and cleaner. The painted window frame is also pre-treated with a primer. A polyurethane or silicone sealant is applied between the window and the frame. The window is then installed into a quarter window frame opening.

The window is mounted to the window aperture in a portion of the vehicle chassis panel. The window module is then tested by launching towards the test fixture a human surrogate head (49 CFR572E defines head and geometry) at 26, 34 and 40 kilometers per hour. Data are collected regarding the head deceleration upon impact, the disposition of the window and any fragments, and the laceration is measured using 2 layers of a chamois skin placed over the head. The disposition, chamois laceration values[2], and HIC[1] values of the window or its fragments are shown below.

| Head Velocity (km/hr) | Sealant Type | Notch Depth (mm) | Window Disposition | Chamois Laceration Scale | Head Injury Criteria |
|---|---|---|---|---|---|
| 26 | Silicone | 0 | no break | 0 | <1000 |
| 26 | Polyurethane | 0 | no break | 0 | <1000 |
| 34 | Silicone | 0 | break | 0 | <1000 |
| 34 | Polyurethane | 0 | break | 0 | <1000 |
| 26 | Polyurethane | 1.0 | no break | 0 | <1000 |
| 40 | Polyurethane | 1.0 | break | 0 | <1000 |
| 26 | Polyurethane | 2.0 | no break | 0 | <1000 |
| 34 | Polyurethane | 2.0 | break | 0 | <1000 |
| 40 | Polyurethane | 2.0 | break | 0 | <1000 |
| 26 | Polyurethane | 2.5 | no break | 0 | <1000 |
| 34 | Polyurethane | 2.5 | break along notch | 0 | <1000 |
| 40 | Polyurethane | 2.5 | break along notch | 0 | <1000 |
| 26 | Polyurethane | 3.0 | no break | 0 | <1000 |
| 34 | Polyurethane | 3.0 | no break | 0 | <1000 |
| 40 | Polyurethane | 3.0 | break along notch | 0 | <1000 |

Example 4

Extruded sheet of PMMI, 5 mm thick, is thermoformed into the shape and size of an automobile side quarter window. The plastic window is dip coated with a polysiloxane hard coat that provides abrasion resistance. The window is pre-treated with a liquid primer and cleaner. A mold cavity is positioned around the perimeter of the plastic window. Nine bolts 7 are also positioned around the perimeter such that the bolt heads 18 are embedded in the mold cavity. A polyurethane is reaction injection molded into the cavity and around the bolt heads to form the frame 5. The frame is attached to the quarter window aperture by aligning the bolts with the holes 13 located on the vehicle around the window opening and using nuts 15 to screw them in.

The window is mounted to the window aperture in a portion of the vehicle chassis panel. The window module is then tested by launching towards the test fixture a human surrogate head (49 CFR572E defines head and geometry) at 23, 26, 34 and 40 kilometers per hour. Data are collected regarding the head deceleration upon impact, the disposition of the window and any fragments, and the laceration is measured using 2 layers of chamois over the head. The disposition of the window or its fragments is shown below.

| Head Velocity (km/hr) | Window Material | Window Thickness (mm) | Window Disposition | Chamois Laceration Scale | Head Injury Criteria |
|---|---|---|---|---|---|
| 23 | PMMI | 5 | No Break | 0 | <1000 |
| 26 | PMMI | 5 | No Break | 0 | <1000 |
| 26 | PMMI | 5 | No Break | 0 | <1000 |
| 34 | PMMI | 5 | No Break | 0 | <1000 |
| 34 | PMMI | 5 | Cracked | 0 | <1000 |
| 40 | PMMI | 5 | No Break | 0 | <1000 |

PMMI: poly(methyl methacrylate)
PC: polycarbonate

Example 5

Extruded sheet of PMMI, 4 and 5 mm thick, is drape formed into the shape of an automobile side quarter window. The plastic window is flow coated with a silicone based hard coat that provides abrasion resistance and is subsequently cut to size. Extruded sheet of polycarbonate (PC), 4 mm thick, is thermoformed into the shape of an automobile side quarter window and is subsequently cut to size. Each window 4 is then installed in a passenger car driver's door 20 that is equipped with a U-shaped sliding track 22 that allows the window to move up and down.

The window is mounted to the window aperture in a portion of the vehicle chassis panel. The window module is then tested by launching towards the test fixture a human surrogate head (49 CFR572E defines head and geometry) at 18, 26, and 34 kilometers per hour. Data are collected regarding the head deceleration upon impact, the disposition of the window and any fragments, and the laceration is measured using 2 layers of chamois placed over the head. The disposition of the window or its fragments is shown below.

| Head Velocity (km/hr) | Window Material | Window Thickness (mm) | Window Disposition | Chamois Laceration Scale | Head Injury Criteria |
|---|---|---|---|---|---|
| 18 | PMMI | 4 | No Break | 0 | <1000 |
| 18 | PMMI | 5 | No Break | 0 | <1000 |
| 18 | PC | 4 | No Break | 0 | <1000 |
| 26 | PMMI | 4 | No Break | 0 | <1000 |
| 26 | PMMI | 4 | No Break | 0 | <1000 |
| 26 | PMMI | 5 | No Break | 0 | <1000 |
| 26 | PMMI | 5 | No Break | 0 | <1000 |
| 26 | PC | 4 | Edge Disengaged | 0 | <1000 |
| 26 | PC | 4 | Edge Disengaged | 0 | <1000 |
| 34 | PMMI | 4 | Break | 0 | <1000 |
| 34 | PMMI | 4 | Break | 0 | <1000 |
| 34 | PMMI | 5 | Break | 0 | <1000 |
| 34 | PMMI | 5 | Break | 0 | <1000 |
| 34 | PC | 4 | Edge Dis- | | |

| Head Velocity (km/hr) | Window Material | Window Thickness (mm) | Window Disposition | Chamois Laceration Scale | Head Injury Criteria |
|---|---|---|---|---|---|
| | | | engaged | | |

PMMI: poly(methyl methacrylate)
PC: polycarbonate

Example 6

Extruded sheet of PMMI, 5 mm thick, is thermoformed into the shape and size of an automobile side quarter window. The plastic window is dip coated with a polysiloxane hard coat that provides abrasion resistance. The window is pre-treated with a liquid primer and cleaner. A mold cavity is positioned around the perimeter of the plastic window. Nine bolts 7 are also positioned around the perimeter such that the bolt heads 18 are embedded in the mold cavity. A polyurethane is reaction injection molded into the cavity and around the bolt heads to form the frame 5. The frame is attached to the quarter window aperture by aligning the bolts with the holes 13 located on the vehicle around the window opening and using nuts 15 to screw them in.

The window is mounted to the window aperture in a portion of the vehicle chassis panel. The vehicle chassis panel adjacent to a vehicle seat is firmly attached to a test structure. A $50^{th}$ percentile male anthropomorphic side impact dummy (SID) (49CFR572F) with a Hybrid III head (49 CFR572E). The window module is then tested by accelerating the whole test structure (dummy on bench adjacent to vehicle chassis panel) using a HYGE sled, where this acceleration results in head impact velocities of 36 to 37 kilometers per hour. Data are collected regarding the head deceleration upon impact, the disposition of the window and any fragments, and the laceration is measured using 2 layers of chamois skin placed over the head. The disposition, chamois laceration values, and HIC values of the window or its fragments are shown below.

| Head Velocity (km/hr) | Window Disposition | Chamois Laceration Scale | HIC |
|---|---|---|---|
| 36 | module pop-out | 0 | <1000 |
| 37 | module pop-out | 0 | <1000 |

Example 7

Extruded sheet of PMMI, 5 mm thick, is thermoformed into the shape and size of an automobile side quarter window. The plastic window is dip coated with a polysiloxane abrasion resistant coating. A notch in the shape of a letter v, with a 60° angle, is cut 14 mm inward from the outer edge of the several window. The notch is 3.0 mm deep. The window is pre-treated with a liquid primer and cleaner. An automotive foam tapes, with densities in the range of 0.5 to 0.65 grams per cubic centimeter, and 6.2 and 12.5 mm wide, are pressed onto the treated surface. The window and tape are then installed adhesively into a quarter window frame opening by revealing the second side of the foam tape.

The window is mounted to the window aperture in a portion of the vehicle chassis panel. The vehicle chassis panel adjacent to a vehicle seat is firmly attached to a test structure. A $50^{th}$ percentile male anthropomorphic side impact dummy (SID) (49CFR572F) with a Hybrid III head (49 CFR572E). The window module is then tested by accelerating the whole test structure (dummy on bench adjacent to vehicle chassis panel) using a HYGE sled, where this acceleration results in head impact velocities of 36 to 37 kilometers per hour. Data are collected regarding the head deceleration upon impact, the disposition of the window and any fragments, and the laceration is measured using 2 layers of chamois skin placed over the head. The disposition, chamois laceration values, and HIC values of the window or its fragments are shown below.

| Head Velocity (km/hr) | Tape Width (mm) | Notch Depth (mm) | Window Disposition | Chamois Laceration Scale | Head Injury Criteria |
|---|---|---|---|---|---|
| 42 | 12.5 | 3.0 | break along notch | 0 | <1000 |
| 38 | 12.5 | 3.0 | break along notch | 0 | <1000 |
| 38 | 6.2 | 0 | window pop-out | 0 | <1000 |

We claim:
1. A vehicle window frame assembly comprising:
   1) a vehicle window frame;
   2) a sheet of thermoplastic polymer glazing positioned in the window frame said thermoplastic polymer glazing having
      a) an elastic modulus of from about 2.0 to about 4.26 GPa;
      b) a coefficient of thermal expansion of from about 4 to about $8 \times 10^{-5}$ cm/cm°F. at room temperature; and
      c) a continuous service temperature of at least about 70° C.;
   3) double sided adhesive foam tape means circumferentially positioned around said window frame for releasably attaching the sheet of thermoplastic polymer glazing to the window frame, wherein:
      a) the glazing remains attached to the window frame at head impact velocities against the glazing at less than about 32 kilometers per hour; and
      b) the glazing becomes detached from the window frame at head impact velocities against the glazing at greater than about 32 kilometers per hour; and
   4) weatherstripping means positioned circumferentially around the thermoplastic polymer glazing for providing a weather seal.

2. The vehicle window frame assembly of claim 1 wherein the sheet of thermoplastic polymer glazing is a material selected from poly (methyl methacrylate), impact modified poly (methyl methacrylate), polyglutarimide, poly(methylmethacrylimide), poly (methyl methacrylate-co-alkyl acrylate) wherein the alkyl group contains 1 to 8 carbon atoms, poly (vinyl chloride), poly (styrene-coacrylonitrile) wherein the acrylonitrile polymer comprises up to 40% of the copolymer, polycarbonate, poly (ethylene terephthalate), polystyrene, poly (styrene-co-methyl), poly (alpha-methylstyrene-co-methyl methacrylate), poly (alpha- methylstyrene-co-methyl methacrylate), poly (alpha-methylstyrene-co-alkyl acrylate) wherein the alkyl group contains 1 to 8 carbon atoms, poly (vinyl acetate), poly (ester carbonate), polyarylate, poly (ether sulfone), polyetherimide.

3. The vehicle window frame assembly of claim 1 herein said sheet of thermoplastic polymer glazing contains a notch or groove on the inside or the outside of the sheet thereby providing a breakaway zone.

4. The vehicle window frame assembly of claim 1 wherein the sheet of thermoplastic polymer glazing is 1.5 mm to 6.0 mm in thickness.

5. The vehicle window frame assembly of claim 1 wherein the double sided adhesive foam tape means is 5 to 26 mm wide; 1 to 7 mm thick and has a density of 0.3 to 0.8 grams per cubic centimeter.

6. The vehicle window frame assembly of claim 1 wherein the sheet of thermoplastic polymer glazing material is colored tinted or treated for solar control.

7. The vehicle window frame assembly of claim 1 wherein the sheet of thermoplastic polymer glazing material is coated with an abrasion resistant coating.

8. The vehicle window frame assembly of claim 1 wherein the double sided adhesive foam tape means is selected from tapes made from acrylic, polyurethane, neoprene.

9. The vehicle window sheet of frame assembly of claim 3 wherein the notch or groove is 10% to 80% of the thickness of the thermoplastic polymer glazing and wherein the notches or groove is 1 to 100 mm from the perimeter edge and wherein the notch or groove is on one, two, three, four or more sides of the window perimeter or parts thereof.

* * * * *

UNITED STATES PATENT AND TRADEMARK OFFICE
CERTIFICATE OF CORRECTION

PATENT NO. : 5,419,088
DATED : May 30, 1995
INVENTOR(S) : Paul J. Raymond, Robert W. Jans, John J. Reilly It is certified that error appears in the above-identified patent and that said Letters Patent is hereby corrected as shown below:

Column 5, line 61, change "arty" to -- any --.

Claim 2, line 32, change "°F" to -- °C. --

Claim 2, line 61, change "(styrene-co-methyl)" to -- (styrene-co-methyl methacrylate) --.

Claim 2, line 62, delete line

Claim 2, line 66, change "(ether sulfone), polyetherimide" to -- (ether sulfone) or polyetherimide --.

Claim 3, line 68, change "herein" to -- wherein --.

Claim 6, line 15, change "colored" to -- colored, --.

Claim 8, lines 6 and 7, change "polyurethane," to -- polyurethane or -- .

Signed and Sealed this

Seventh Day of April, 1998

*Attest:*

BRUCE LEHMAN

*Attesting Officer*  *Commissioner of Patents and Trademarks*